United States Patent [19]
Hall et al.

[11] Patent Number: 5,563,849
[45] Date of Patent: *Oct. 8, 1996

[54] ACOUSTIC TRACKING SYSTEM

[75] Inventors: John D. Hall, Walnut Creek; Bruce Gordon, Santa Barbara; Clarence E. Miller, Goleta; Kenneth D. Brewer, La Jolla, all of Calif.

[73] Assignee: Coastal & Offshore Pacific Corporation, Walnut Creek, Calif.

[*] Notice: The term of this patent shall not extend beyond the expiration date of Pat. No. 5,410,519.

[21] Appl. No.: 495,553

[22] PCT Filed: Oct. 7, 1994

[86] PCT No.: PCT/US94/11224

§ 371 Date: Jul. 19, 1995

§ 102(e) Date: Jul. 19, 1995

[87] PCT Pub. No.: WO95/14242

PCT Pub. Date: May 26, 1995

Related U.S. Application Data

[63] Continuation-in-part of Ser. No. 155,950, Nov. 19, 1993, Pat. No. 5,410,519.

[51] Int. Cl.$^6$ ............................................. G01S 3/80
[52] U.S. Cl. ............................................. 367/127
[58] Field of Search ........................... 367/127, 118, 367/124, 125, 126, 129

[56]  References Cited

U.S. PATENT DOCUMENTS

| | | | |
|---|---|---|---|
| 3,715,577 | 2/1973 | Bohman | 367/127 |
| 3,893,061 | 7/1975 | Slawsky et al. | 367/2 |
| 4,119,941 | 10/1978 | Moore et al. | 367/134 |
| 4,119,942 | 10/1978 | Merklinger | 367/126 |
| 4,446,542 | 5/1984 | Beckerle | 367/131 |
| 4,509,151 | 4/1985 | Anderson | 367/118 |
| 4,604,733 | 8/1986 | Brown et al. | 367/2 |
| 4,622,657 | 11/1986 | Clare | 367/129 |
| 4,800,541 | 1/1989 | Farmer et al. | 367/424 |
| 4,805,160 | 2/1989 | Ishii et al. | 367/134 |
| 4,914,642 | 4/1990 | Fraser et al. | 367/129 |
| 5,095,467 | 3/1992 | Olson et al. | 367/125 |
| 5,410,519 | 4/1995 | Hall et al. | 367/127 |

OTHER PUBLICATIONS

Thomas et al., *Acoustic Detection of Cetaceans Using A Towed Array of Hydrophones*, Rep. Int. Whal. Commn. (Spec. Issue 8) pp. 139–148 (1986).

Urick, *Principles of Underwater Sound*, pp. 99–104 (1984).

*Primary Examiner*—Daniel T. Pihulic
*Attorney, Agent, or Firm*—Baker, Maxham, Jester & Meador

[57]  ABSTRACT

An acoustic tracking system designed to allow scientists and fishermen to follow dolphins and whales without harming or harassing them. The system utilizes six flow shielded hydrophones mounted on the bottom of a vessel in two arrays of three hydrophones in each array. Acoustic signals of interest (dolphin calls) which strike the hydrophone piezo-electric elements are transmitted to a receiver-display device which determines and displays both the bearing to the signal of interest and the relative range from the vessel to that signal. The receiver-display device utilizes digital microprocessors to determine the difference in signal arrival time of an incoming signal at pairs of hydrophones. The resulting computed bearing to the dolphin call is displayed as a lighted indicator on an electronic heading display. In addition, the digital microprocessors compare the received sound pressure level of incoming signals of interest and display the relative range as a series of lighted LED's on the electronic heading indicator.

17 Claims, 2 Drawing Sheets

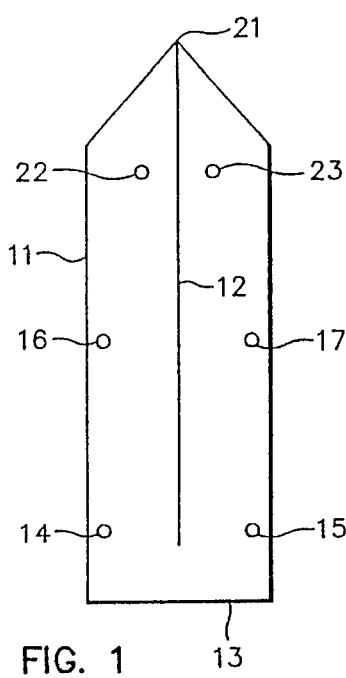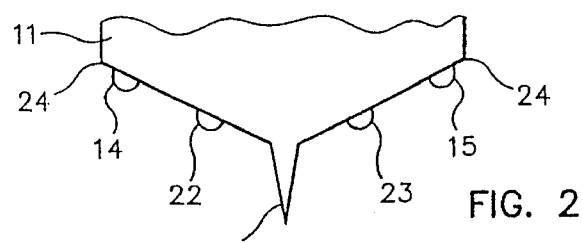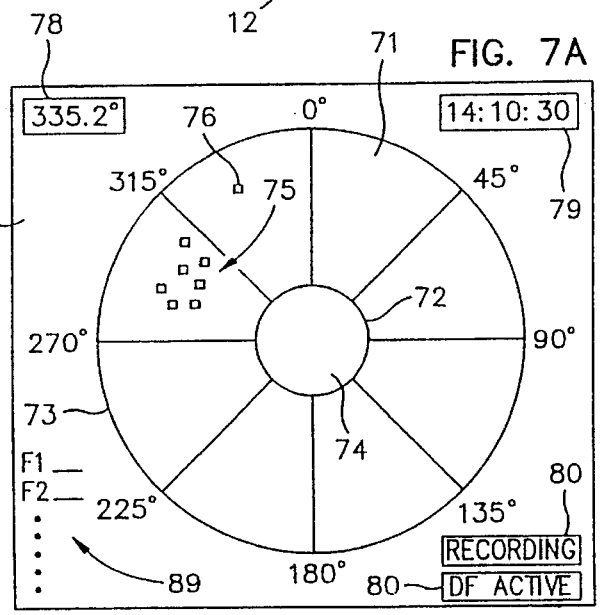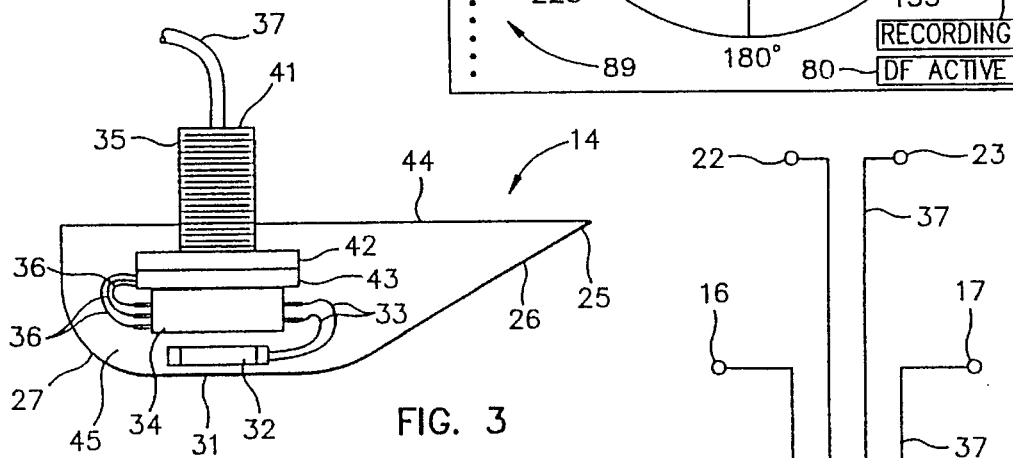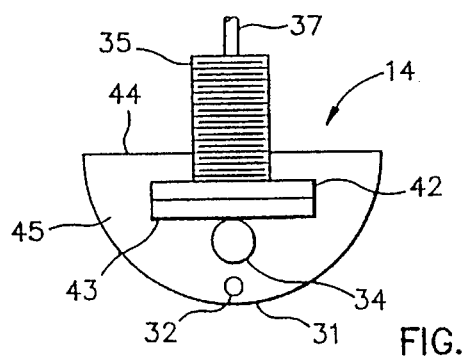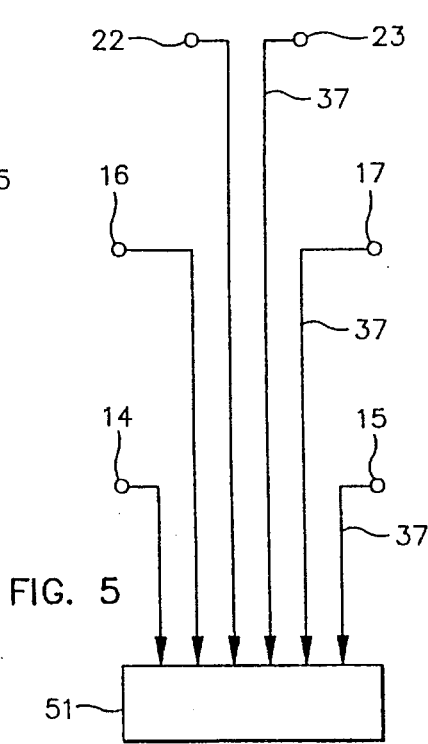

1

ACOUSTIC TRACKING SYSTEM

CROSS-REFERENCE TO RELATED APPLICATION

This is a continuation-in-part of application Ser. No. 08/155,950, filed 19 Nov. 1993, now U.S. Pat. No. 5,410,519.

TECHNICAL FIELD

The invention relates generally to an underwater acoustic tracking system comprised of a plurality of hydrophones mounted on an ocean-going vessel to receive signals generated by cetaceans such as dolphins or whales. More particularly, the invention provides means for determining relative range and bearing from the vessel to the signal producing cetacean or source.

BACKGROUND ART

There are many scientific studies in tropical, temperate and polar waters which depend on or can be materially assisted by a means to locate and identify various species of cetaceans. There are also commercial reasons to locate these animals.

Location can be done by triangulation using the angle of arrival measured from widely spaced vessels or other acoustic sensors whose position is known. Multiple sensors or vessels are expensive and the location computations are complex so that correlation and location can take hours or even weeks. This prohibits adaptive placement of resources to improve data or resolve ambiguities.

It is known that yellowfin tuna follow dolphins in certain areas of the ocean, particularly the Eastern Tropical Pacific Ocean, a geographically well defined area. This is an area of large, harvestable schools of tuna. A significant factor is that in the past, the dolphins around which the tuna tended to gather or follow, were caught in nets along with the target tuna and either injured or killed in many instances. This waste of mammal life has become socially undesirable and, in accordance with the International Dolphin Conservation Act of 1992 of the United States of America, yellowfin tuna must be harvested by techniques which do not harass, harm or kill the associated dolphins. In view of the fact that this law has effect from 1 Mar. 1994, the setting of nets on dolphins in order to catch tuna which follow the dolphins is prohibited. The law incorporates harsh embargo provisions, making it economically unattractive for nations to sell any fish or shellfish products to the United States which use nets to harvest tuna that follow dolphins. Thus techniques for harvesting tuna, particularly yellowfin tuna that follow dolphins is the Eastern Tropical Pacific Ocean, must necessarily be accomplished by means other than setting nets on dolphin.

However, there is no reason to restrict the use of dolphins as a means of locating schools of tuna. Dolphins emit identifiable calls which can be an acoustic basis for finding tuna for harvesting purposes.

Examples of underwater acoustic detection system are shown in U.S. Pat. Nos. 4,622,657 (Clare); 4,509,151 (Anderson); and 3,893,061 (Slawsky et al.).

The Clare patent uses an array of hydrophones arranged in linear groups at right angles to each other or, alternatively, hydrophones located at corners of a regular pentagon. One important aspect of the disclosure of this reference is its unequal spacing between detecting pairs. Successive zero-crossings of waves detected by the two hydrophones in each of several different pairs is used to determine direction or beating. The system of the Clare patent appears to use analog signals fed to a computer where the time delay of the arriving signal is computed between pairs of hydrophones. However, this patent does not show any bearing solution output device or indicator. Further, no aspect of the Clare patent relates to range determination through the use of the hydrophone array.

The Anderson patent has as its primary purpose the detection and classification as to type and location of different marine animals using a passive towed array of hydrophones. There is no attempt in Anderson to determine range, and direction is determined only in a general, relatively crude fashion. This mechanically derived bearing to a sound source is determined by steering the towing vessel and determining increases or decreases in the levels of signals received. Anderson's bearing solution is based on the ability of observers to listen to the output of the sensors and binaurally determine the general bearing to the sound source. This patent discloses no graphic output display and no digital storage mechanism relating to bearing solutions. Anderson's system is able to determine different incoming frequencies only by mechanically changing the interhydrophone distances of each group of sensors. Further, by employing a towed array, the Anderson system is impractical for commercial fishing operations.

A third underwater passive acoustic detection system is shown in the Slawsky patent. This patent relates to a harbor entrance or other defined body of water where the system of the patent is designed to detect approaching ships or other moving objects. Pursuant to a signal of higher DC level than ambient signals detected by the hydrophone, a signal is transmitted underwater to a central receiving hydrophone where appropriate indications are made. There is no attempt by Slawsky to determine range or bearing by this means. Further, it is not directed to marine animals.

For many years there has been interest in locating objects, primarily animals, for environmental studies of the impact of human activity on other species. One common method with land animals has been to attach radio telemetry equipment to individual animals and track the movement of the animals using radio detection equipment. The same technique has been applied in the ocean with regard to radio tracking animals that come to the surface to breathe, such as, whales, dolphins and turtles. In addition, investigators have attached sonic pingers to fish and sharks to track them as they move through the water. All these techniques require the attachment of a tracking device to the animal to be tracked. Because small toothed cetaceans, including dolphins, are extremely sensitive to sounds in the ocean, and use sound as one of their primary sensory modalities, it would be inappropriate, and quite likely illegal, for an acoustic location system to use any form of active or active/passive acoustic system, such as sonar or acoustic tags, to locate the dolphins. This is because such a system would have a high potential for disrupting the behavior and biology of the dolphins and possibly causing them harm.

DISCLOSURE OF INVENTION

Broadly speaking, this invention enables fishermen or scientists to locate yellowfin tuna from the sounds emitted by the typically accompanying dolphin and then harvesting the tuna by means not inimical to the dolphin. This is fully in compliance with the United States International Dolphin Conservation Act of 1992.

The subject invention has wide application. For clarity and simplicity, a single commercial application is used for illustration in the following material.

In its basic form, the invention comprises an acoustic tracking system mounted on an ocean-going vessel having a keel and a chine on either side of the keel, the system being employed for locating and tracking sound emitting cetaceans remote from the vessel, the sounds emitted by the cetaceans having known characteristics and acoustic parameters, said system comprising: an array of a plurality of sound sensitive units mounted on the bottom of the vessel and receiving the cetacean originated acoustic signal sounds through the water and converting the sounds to electrical signals; receiver means mounted on the vessel; means for transmitting the electrical signals from said sound sensitive units to said receiver means; means included in said receiver means pursuant to the signals received from a plurality of said sound sensitive units for calculating relative range and bearing from the vessel to the acoustic signal producing cetacean; and means connected to said receiver means for indicating said bearing and range.

The invention employs a passive array of flow shielded hydrophones mounted on the bottom of an ocean-going vessel, preferably in two arrays of at least three hydrophones in each array. Acoustic signals of interest—dolphin or whale calls—which strike the hydrophone piezo-electric elements, are transmitted to a receiver/display device which determines and displays both the bearing to the origin of the signal of interest and the relative range from the vessel to that signal source. The receiver/display device utilizes digital microprocessors to determine the difference in signal arrival time of an incoming acoustic signal at pairs of hydrophones. The resulting computed bearing to the dolphin or whale call is displayed as a target at the proper angle on an electronic heading display. The digital microprocessors also calculate the received sound pressure level of the incoming signal and display the corresponding range as radial distance on the same display.

In a preferred form of the invention, the receiver/display device would be on the same vessel as are the hydrophone arrays. However, the signals from the hydrophones could very well be transmitted at a distance to a remote receiver/display device on another vessel or even on an aircraft or a land mass where the calculations would take place. In such instance, the resulting bearing and range would be retransmitted to the vessel on which the hydrophones are mounted or to other vessels in the general vicinity. It is possible that one hydrophone carrying vessel could be the target locator for several fishing boats in the area and the range and bearing information could be computed and transmitted to each of them.

BRIEF DESCRIPTION OF DRAWING

The objects, advantages and features of this invention will be more readily appreciated from the following detailed description, when read in conjunction with the accompanying drawing, in which:

FIG. 1 is a schematic plan view of the hull of a boat or ship showing the relative locations of the hydrophones in the array;

FIG. 2 is a schematic partial end view of the vessel of FIG. 1 showing the relative locations of the hydrophones mounted to the underwater surface of the vessel;

FIG. 3 is a side partial sectional view of a flow shielded hydrophone used with the system of the invention;

FIG. 4 is a front view of the hydrophone of FIG. 3;

FIG. 5 is a schematic representation of the acoustic data flow from each of the hydrophones to a receiver/display unit;

FIG. 7A is an enlarged representation of the range and bearing monitor shown in FIG. 7.

BEST MODES FOR CARRYING OUT THE INVENTION

Figure 6:
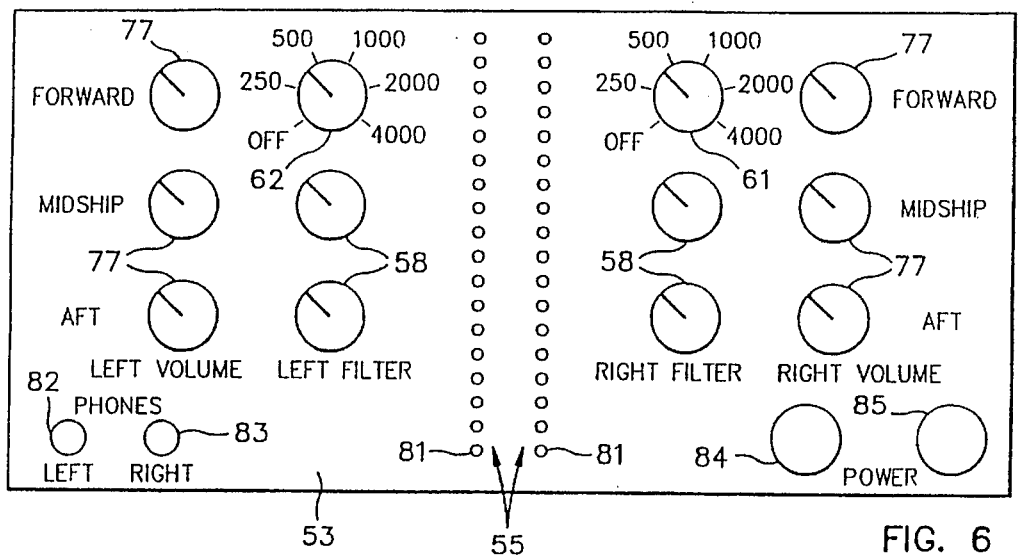
FIG. 6 is a face view of the front panel of the receiver/display unit of the invention.

The system of this invention is particularly designed to allow scientists and fishermen to follow dolphins and whales in the Eastern Tropical Pacific Ocean and thus allow the safe and efficient harvesting of yellowfin tuna that follow dolphins in this area without harassing, harming or killing the dolphins in the process. The system is fully passive and is primarily intended to detect signals produced by pelagic dolphins as an acoustic source for a system that determines the bearing and relative distance from a vessel to the source of the acoustic signals. These signals are referred to as dolphin calls or vocalizations, not including echo location sounds which the dolphins also produce. This system enables the location of yellowfin tuna that follow dolphins by determining the location of the dolphins and then hook and line techniques can be used to catch the tuna, thereby having no adverse effect whatsoever on the dolphins. This system is in full compliance with the International Dolphin Conservation Act of 1992.

With reference now to the drawing, and more particularly to FIGS. 1 and 2, there is shown the outline of ocean going vessel 11 having arrays of hydrophones attached to its underwater surface. On either side of keel 12 is an array of hydrophones. Three hydrophones are shown in each array. The left hand array (as seen in FIG. 1) is comprised of hydrophone units 14, 16 and 22. The right hand array is comprised on hydrophone units 15, 17 and 23. It is clear from FIG. 1 that the sound sensors (hydrophones) are in non-linear arrays.

In this preferred embodiment, the total array of hydrophones is comprised of at least five units mounted on the bottom of the vessel so that not less than three hydrophones are located inboard of either vessel chine 24 shown in FIG. 2. Spacing between hydrophones, or hydrophone arrays, should preferably be between 3 and 10 meters. Spacing between the left and right hand array elements at the bow, and between the left and right hand elements at the stern should also be between 3 and 10 meters. A spacing of 10 meters provides a time delay between hydrophones of about seven milliseconds in tropical oceans where the speed of sound in surface waters above the thermocline is approximately 1,500 m/s. Use of hydrophone elements sensitive to a wide range of acoustic frequencies (10 Hz–20 kHz), and a ten-meter spacing between the hydrophone elements located along each chine of the vessel, allows the detection and analysis of a wide frequency range of acoustic signals produced by dolphins and whales.

Recent computer modeling and at sea experiments have demonstrated that in terms of the frequency band of interest, the spacing between adjacent hydrophone pairs should be equal to one-half of the acoustic wavelength of received signals of interest. From a practical standpoint, the invention works well to accurately determine range and bearing to signals of interest for a frequency band whose wavelengths are more than twice the adjacent hydrophone spacing (lower frequencies) to less than one half the adjacent hydrophone spacing (higher frequencies). Thus if the adjacent hydrophones are spaced for a 4 kHz signal, the system works well to accurately indicate the range and bearing on signals from below 2 kHz to above 8 kHz.

For examples of adjacent units, in FIG. 1, unit 23 is adjacent to units 22 and 17, unit 15 is adjacent to units 17 and 14, and unit 16 is adjacent to units 14 and 22.

Because commercial vessels operating on the high seas are generally deep draft vessels constructed of steel, the keels of these vessels, located along the midline of the vessel, provide a substantial barrier to near surface sound traveling through the ocean from one beam aspect of the vehicle to the other. The result of this substantial blocking is that acoustic signals transmitted within about sixty degrees of perpendicular to the beam of the vessel are received on the opposite side array with substantial time and waveform distortion compared to signals at the near side array. They also have substantially lower received sound pressure level on the opposite side array. This characteristic is used to help eliminate directional ambiguity of the arriving signal of interest by comparing the instant of signal arrival and the received signal level between the port and starboard hydrophone arrays.

With reference now to FIGS. 3 and 4, hydrophone 14 is shown as an example. All of the hydrophones have the same structure. Each hydrophone is designed so that water flow noise over the unit itself is minimized. Rearward end 25 includes a gradually sloping surface 26 whereas the leading or front end 27 is more rounded or curved. The entire outer housing or surface 31 is laterally rounded in semi-circular fashion as shown in FIG. 4. Piezo-electric sensing element 32 is shown mounted closely adjacent to the inside surface of the hydrophone housing. This is connected by wires 33 to hydrophone preamplifier 34. The signals from the preamplifier are transmitted through mounting element 35 by means of wires 36, and shielded electrical cable 37 transmits the signals from the hydrophone to the receiver/display unit. Mounting element 35 is comprised of threaded end 41 which may be referred to as a hull penetrator element whereby the hydrophone itself is mounted directly to the hull of the vessel and provides access for cable 37 to connect to the receiver/display unit. The mounting device includes plate 42 to which is mounted shock absorbing pad 43 which may be made of a suitable cushioning material. The entire interior of hydrophone 14 between surface 44, which is adapted to be in confronting relationship with the hull of the vessel, and housing 31, is filled with a conventional flow noise reducing potting compound 45. The hydrophone is purchased as a unit on the open market and is a conventional product.

FIG. 5 shows the acoustic data flow from the individual hydrophones to receiver/display unit 51. Acoustic signals detected by the hydrophones are converted to electrical energy by the piezo-electric element in each hydrophone. That signal is amplified by internal preamplifier 34 and transmitted by means of shielded cable 37 to receiver/display unit 51. At the receiver/display unit (FIG. 7) the acoustic signals from each hydrophone are converted to digital signals and processed using a high speed analog to digital converter (61–66) for each hydrophone.

Prior to cross correlation to determine differential times of arrival, the six digital data streams from the hydrophones are converted by microprocessor 67 from individual amplitude points to amplitude/frequency points using an 8 to 1 (8:1) decimation ratio. This process takes advantage of the variable frequency of cetacean calls of interest to resolve the multiple ambiguities that would otherwise result from the multiple wavelength spacing of the hydrophones. This process also sharply reduces the cross correlation computation, permitting near real time bearing and range determination using a high performance personal computer (PC).

A conventional time delay or correlation beam forming equation is as follows:

$$b_m(t) = \sum_{n=0}^{N-1} w_n e_n \left( t - \frac{nd\sin\theta_m}{c} \right) \quad \text{Eq. 1}$$

where: $b_m(t)$=steered beam direction of the vessel $e_n$=time delay between sensors in each pair $w_n$=weights applied to each element signal t=initial time of signal arrival nd=array length c=speed of sound in water $\theta_m$=angle of arrival at $m^{th}$ source element (De Fatta et al., Digital Signal Processing: A System Design Approach, John Wiley & Sons, Inc., 1988).

Direction is determined by a calculation similar to conventional beam forming for each adjacent hydrophone pair. The results of each computation are weighted for amplitude and then "graded" for consistency. If an inconsistency is found, a target is not placed on the output display. An example of an inconsistency is two adjacent hydrophone pairs with nearly equal sound pressure that show a difference in direction of 40 degrees. This mechanism will significantly reduce false information due to echoes, multiple simultaneous signals, and noise. The amplitude limits or threshold of this process are adjustable and set by the system operator.

As an alternative to conventional time delay beam forming, an adaptive beam forming technique can be utilized to improve side lobe cancellation and narrow the main lobe response. An adaptive beam forming processor could use the following least-mean square equation:

$$W_k(N+1) = W_k(N) + 2\mu\epsilon(N-K) + \text{tm} \quad \text{Eq. 2}$$

where: $W_k$=Weight value of Tap Delay Line Index

N=Time Index

µ=Learning rate constant $\epsilon$=Error signal

K=Index of Tap Delay Time (Windrow et al., Adaptive Signal Processing, Prentice-Hall, Inc., 1985).

As in conventional time delay beam forming, an appropriate time delay for a chosen look direction is applied to each sensor signal and the resulting time series are summed to form a desired signal. In addition to this desired signal, a set of difference signals is formed by subtracting each pair of delayed sensor signals. These difference signals are then passed to an adaptive processor. The adaptive processor produces a correction signal which is combined with the desired signal to form the overall output of the adaptive beam former. This output signal is also fed back to the adaptive processor as an error signal. In this manner, the adaptive processor minimizes the output of the beam former using only the interference component as input. The overall output of the adaptive beam former is then the undistorted target signal from the chosen look direction with minimum additive noise. This is the maximum-likelihood estimate of the target signal.

Several possible configurations of the adaptive processor are possible including a wide range of single layer neural network configurations. The simplest configuration would be a single tap delay line (TDL) adaptive filter on each of the difference signal inputs with a least-mean squares (LMS) algorithm applied as noted above.

Figure 7:
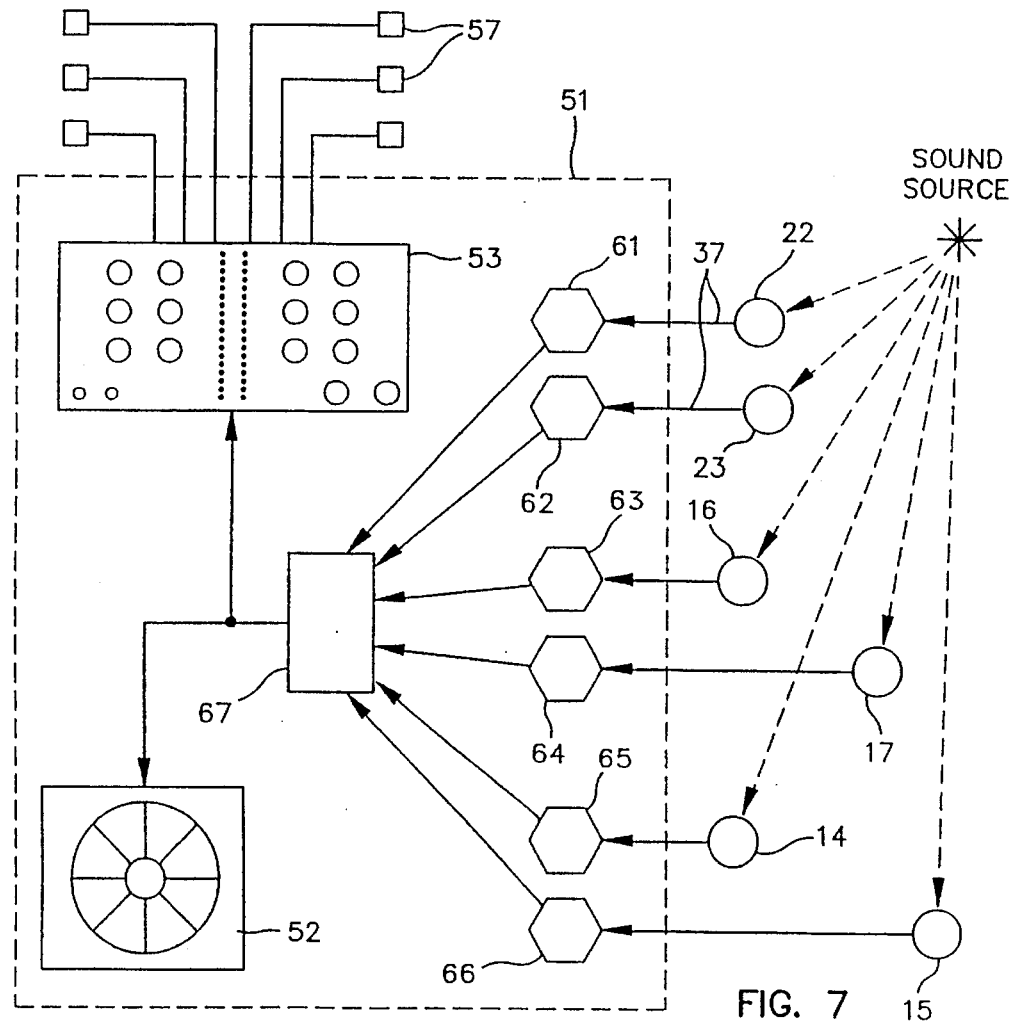
FIG. 7 is a block diagram of the receiver/display unit of the invention.

The resulting bearings are displayed on microcomputer monitor 52 associated with microprocessor 67 in receiver/display unit 51 (FIGS. 7 and 7A). Targets are displayed in area 71 between inner circle 72 and outer circle 73. Center 74 of the display is not used for target display because angle information would be obscured. The display is usually arranged to display the strongest signals near the outside circle for best bearing resolution. The display can also optionally be reversed so the strongest (closest) signals are displayed near the center so that the display resembles a map or radar PPI.

Targets may be allowed to accumulate until erased manually or may be removed in order after a few seconds. Either mode allows calls grouped by angle or by range to be observed. Examples of target displays are group 75 or single target 76.

The following discussion relates to the means and method by which range from the vessel to the acoustic signal originator is determined. Dolphin vocalizations approximate 160 dB source level re (referenced at) 1 µPa at 1 m for calls with substantial acoustic energy at frequencies between 4 kHz and 20 kHz. Typically the frequency range at peak energy is 8–11 kHz. The duration of the dolphin calls of interest is about 680 ms. Sound propagation loss models in deep ocean waters approximate $20 \log_{10}R$, where R is the range from the signal source to the receiver measured in meters. This $20 \log_{10}R$ loss equation is valid out to distances about equal to the water depth. At greater distances, the incremental equation approximates $10 \log_{10}R$. The received acoustic level for dolphin calls with a source level of 160 dB will range from 140 dB at 10 m to 80 dB at 10,000 m. The ambient noise level in deep oceans for frequencies between 4 kHz and 20 kHz is approximately 60 dB re 1 $\mu Pa^2/Hz$ for calm conditions. The basic characteristics and relationships of sound in water are discussed in Urick, Principles of Underwater Sound (McGraw-Hill, Inc., 1983).

The receiver/display system of this invention has the ability to reliably determine direction of acoustic signals that are about 15 dB above ambient noise in the frequency spectrum of interest, which is 4 kHz to 20 kHz. Aural identification combined with indicator 55 (FIG. 6) should extend this range to near 0 dB signal to noise ratio (SNR) for detection and 5 dB SNR for left-right steering to target. The microprocessors in the receiver/display system perform a received level analysis on the incoming acoustic signal by comparing the voltage level of the incoming signal with the known hydrophone voltage level output for a specific signal input level. The resulting output signal from the microprocessors represent the range estimate and is shown both as a radial position for every target on microcomputer monitor 52 and on the front panel of the receiver/display system as indicator 55, which is shown as two series of LED's arranged vertically. The display is arranged so that each LED represents 3 dB of received signal level increase so that the 20 LED's cumulatively provide a dynamic range of 60 dB.

The lowest LED 81 in each chain, preferably of a contrasting color, is a built-in test indicator. The hydrophone amplifier gains will typically be set to illuminate the lowest signal LED on background noise. Illumination of a second light would indicate reception of signal equal to noise, for example, a dolphin or a whale call at a range of 100,000 m in calm conditions (assuming the worst case transmission loss of $20 \log_{10}R$) out to maximum range. A call at a range of 50,000 m broadside to the tracking vessel would light four LED's on the near side and only one or two on the far side. If the LED's were all lit, this would indicate a range of less than 150 m to the calling animal.

In this manner, the system operator is able to detect and track dolphin calls when they are as far away as 50,000 m and as close as 150 m. Because the dolphin schools that yellowfin tuna associate with average more than 600 animals per school, a distance of 280 m would indicate that the vessel is sufficiently close to the dolphins to be ready to begin fishing for tuna. That size school of dolphins would yield approximately 16 tons of tuna, or about 800–1000 tuna.

To enable the system described above to function to its full capability with signal detection and location, the receiver/display system is equipped with five digital high pass frequency filters within unit 53 which the operator can select by means of knobs 58 to eliminate ambient and vessel associated sounds. These filters effectively eliminate frequencies below 250 Hz, 500 Hz, 1 kHz, 2 kHz and 4 kHz, as shown in conjunction with knobs 68 and 69 in FIG. 6. Because most ambient ocean noise and vessel generated sounds, especially sounds produced by vessels proceeding at speeds below 10 knots, are below 2 kHz, it is possible to eliminate almost all of the masking signals generated by these sources. This then allows acoustic signals of interest, which are dolphin calls in the 4 kHz to 20 kHz frequency range, to be detected and analyzed more efficiently.

During continuous Direction Finding (DF) operation, DF calculations are made approximately two times each second and hydrophone data between calculations is not used. The microprocessor circuits contain sufficient memory to store all of the information in the last five seconds of sound signals. This memory can be "frozen" by pressing a key on the computer. The information can then be played repeatedly and any selected one-second portion can be analyzed over and over for Direction Finding and range, using all the data while adjusting thresholds to capture the desired sound.

The receiver/display unit is also equipped with a 20 kHz low pass filter that prevents interference from acoustic signals above 20 kHz. Thus the device has the ability to band pass acoustic signals from 10 Hz—the lowest frequency the hydrophone preamplifier is designed to transmit—to 20 kHz in steps of 10 Hz–20 kHz; 250 Hz–20 kHz; 500 Hz–20 kHz; 1 kHz–20 kHz; 2 kHz–20 kHz; and 4 kHz–20 kHz. In addition to the selectively employed (knobs 58) digital high pass filters for the hydrophone channels, the receiver/display system contains volume controls 77 for the hydrophone channels. The output of these controls is connected to high efficiency speakers 57 (FIG. 7), one for each hydrophone channel, oriented to match the geometry of the hydrophones mounted on the vessel hull. These speakers allow the operator to act in conjunction with the system to listen to the incoming acoustic signals and to binaurally monitor the signals.

To complete the description of the front panel of indicator unit 53, plugs 82 and 83 represent respective left and right headphones, and knobs 84 and 85 are the power switches for the computer and the amplifier, respectively.

Front panel display 52, as shown in FIG. 7A, includes visual indication 78 of the bearing of the most recently detected target and local time readout 79. The microcomputer is operated by means of a standard computer keyboard. A specific group of keyboard keys is reserved for "special actions," allowing single keystroke control of most digital processing functions. Menu 89 showing these "special action" keys and their functions is displayed on the lower left portion of display panel 52. The special functions which are active are indicated in boxes 80, shown in the lower right corner of the panel. These indicator display elements may be located at any convenient place on panel 52 and their positions shown in FIG. 7A are by way of example only. There may be others, and there may be more boxes 80.

Because human hearing is not efficient at discriminating the directional source of sounds above about 6 kHz, the signal storage device allows for a selectable reduction in playback speed, resulting in proportional frequency downshifting before the signals are projected over the loudspeakers. Any stored segment can be played back at speeds between 10% and 100% of the recorded speed to place the signal projected from the loudspeakers in an efficient range for directional detection by the operator.

It will be appreciated from this description that the piezo-electric transducer of the hydrophone provides the signals from which both range and bearing are derived. The system shown in FIG. 7 compares signal arrival times at pairs of hydrophones. Using standard mathematics it can be seen that with six sensors there are 15 pairs for comparison of arrival times, although only the six adjacent pairs are normally used for calculations. The amplitude level at the first hydrophone receiving the signal determines the range to the source. That is because the sound level at the source, at the relevant frequencies, is known. The sound attenuation, or propagation loss, related to distance in water, is also known. The amplitude level at the hydrophone then enables the range to be determined quickly and easily.

The invention has been described in relation to a specific embodiment of six hydrophones affixed to the underwater hull of a vessel. Theoretically, three hydrophones could be used if the keel was not present and four could be used with a keel, but at least six are preferred to reduce ambiguity and noise. Even more than six could be employed. Other types of sound sensitive units could prove useful. A particular type of dolphin has been considered in conjunction with tuna fishing. The system can be used to detect and track any type of cetacean for any purpose.

In view of the above description, it is likely that modifications and improvements will occur to those skilled in the art which are within the scope of the accompanying claims. For example, signal sensors other than hydrophones may be used. The medium or environment in which the signals are propagated need not be the ocean, or even water. The signal processing means takes the signals from the signal sensor pairs and, based on the time difference of arrival of a complex signal, determines the bearing to the source of origin of that signal. With known parameters and attenuation constants or equations in memory, the amplitude of the received signals is employed to determine range to the signal source.

We claim:

1. An acoustic tracking system mounted on an ocean-going vessel having a keel and a chine on either side of the keel, the system being employed for locating and tracking sound emitting cetaceans remote from the vessel, the sounds emitted by the cetaceans having known characteristics and acoustic parameters, said system comprising:

an array of a plurality of sound sensitive units mounted on the bottom of the vessel and receiving the cetacean originated acoustic signal sounds through the water and converting the sounds to electrical signals;

receiver means mounted on the vessel;

means for transmitting the electrical signals from said sound sensitive units to said receiver means means included in said receiver means pursuant to the signals received from a plurality of said sound sensitive units for calculating relative range and bearing from the vessel to the acoustic signal producing cetacean; and means connected to said receiver means for indicating said bearing and range.

2. The tracking system recited in claim 1, wherein said means for calculating bearing employs a cross correlation beam forming technique.

3. The tracking system recited in claim 1, wherein said means for calculating bearing employs an adaptive beam forming technique.

4. The tracking system recited in claim 1, wherein:

the electrical signals representing the received sounds comprise an individual digital data stream from each said sound sensitive unit;

said means for calculating bearing comprises a microprocessor comprising:

means for converting the digital data streams from individual amplitude points to amplitude/frequency points using an 8 to 1 decimation ratio;

means for cross correlating the amplitude/frequency points to determine differential times of arrival of the acoustic signal sounds at the sound sensitive units; and means for accurately calculating range and relative bearing to the source of the cetacean originated sounds.

5. An acoustic tracking system for a remote signal source emitting signals of predetermined frequencies, said system comprising:

an array of sound sensitive units mounted on a body in the medium in which the signals are being propagated, said units receiving and converting the acoustic signals to electrical signals, the spacing between adjacent said units being equal to or greater than one-half the wavelength of the signals;

receiver means mounted on said body;

means for transmitting the electrical signals from said sound sensitive units to said receiver means; and signal processing means in said receiver means to unambiguously determine the time difference of arrival of a complex signal at each adjacent pair of said units and thereby determine the bearing from the body to the signal source.

6. The tracking system recited in claim 5, wherein:

said signal processing means is further sensitive to the amplitude of the received electrical signals, which are proportional to the received acoustic signals;

said receiver means further comprises computation and memory means, said memory means including amplitude characteristics of the signals of interest at the signal source, said computation means including the distance attenuation equations of the predetermined frequencies in the medium; and whereby said signal processing means determines the range from said body to the signal source.

7. The tracking system recited in claim 6, wherein said computation and memory means resolves bearing and range ambiguities by employing many time difference and amplitude calculations and correlating the results.

8. The tracking system recited in claim 7, and further comprising means connected to said receiver means for indicating said bearing and range results.

9. The tracking system recited in claim 5, wherein:

the electrical signals representing the received sounds comprise an individual digital data stream from each said sound sensitive unit;

said means for calculating bearing comprises a microprocessor comprising:

means for converting the digital data streams from individual amplitude points to amplitude/frequency points using an 8 to 1 decimation ratio;

means for cross correlating the amplitude/frequency points to determine differential times of arrival of the acoustic signal sounds at the sound sensitive units; and means for accurately calculating range and relative bearing to the source of the cetacean originated sounds.

10. The tracking system recited in claim 6, wherein the signal stored in said memory means is representative of the amplitude of sound emitted by the cetaceans being tracked at one meter distance from the cetaceans.

11. The tracking system recited in claim 5, wherein said receiver means comprises a low pass anti-aliasing filter which eliminates all incoming signals to said system which are higher than 20 kHz.

12. A method for acoustically tracking sound emitting cetaceans, said method comprising the steps of:

mounting an array of a plurality of sound sensitive units on an ocean-going vessel having a keel and chine on either side of the keel;

moving the vessel and array to the vicinity of acoustic signal producing cetaceans;

receiving such acoustic signals by the plurality of sound sensitive units;

converting tire acoustic signals to electrical signals;

transferring such electrical signals to a receiver;

calculating tire relative range and bearing from the vessel to the acoustic signal producing cetaceans; and providing indications of the calculated range and bearing.

13. The method recited in claim 12, wherein:

the electrical signals representing the received acoustic signals comprise an individual digital data stream from each sound sensitive unit;

the calculating step includes the steps of:

converting the digital data streams from individual amplitude points to amplitude/frequency points by employing an 8 to 1 decimation ratio;

cross correlating the amplitude/frequency points to determine the differential times of arrival of the acoustic signals at the sound sensitive units; and accurately calculating range and relative bearing to the sound of the cetacean originated sounds.

14. The method recited in claim 12, wherein said bearing calculating step employs a cross correlation beam forming technique.

15. The method recited in claim 12, wherein said bearing calculating step employs an adaptive beam forming technique.

16. A method for acoustically tracking a remote signal source emitting signals of predetermined frequencies, said method comprising the steps of:

mounting an array of pairs of sound sensitive units in mutual fixed relationship on a body in the medium in which the signals are being propagated;

receiving the signals by the sound sensitive units, the spacing between the units in each pair being equal to or greater than one-half the wavelength of the signals;

converting the received signals to electrical signals;

transmitting the electrical signals to a receiver; and determining in an unambiguous manner the time difference of arrival of a complex signal at each unit in each pair of units and thereby determining the bearing from the body to the signal source.

17. The method recited in claim 16, wherein:

the electrical signals representing the received acoustic signals comprise an individual digital data stream from each sound sensitive unit;

the calculating steps include the steps of:

converting the digital data streams from individual amplitude points to amplitude/frequency points by employing an 8 to 1 decimation ratio;

cross correlating the amplitude/frequency points to determine the differential times of arrival of the acoustic signals at the sound sensitive units; and accurately calculating range and relative bearing to the source of the cetacean originated sounds.

* * * * *